US008967657B2

(12) United States Patent
Burchi

(10) Patent No.: US 8,967,657 B2
(45) Date of Patent: Mar. 3, 2015

(54) CHILD CARRIER FOLDING CART

(71) Applicant: Shawn C. Burchi, Shelby Township, MI (US)

(72) Inventor: Shawn C. Burchi, Shelby Township, MI (US)

(*) Notice: Subject to any disclaimer, the term of this patent is extended or adjusted under 35 U.S.C. 154(b) by 72 days.

(21) Appl. No.: 13/874,935

(22) Filed: May 1, 2013

(65) Prior Publication Data

US 2013/0292923 A1 Nov. 7, 2013

Related U.S. Application Data

(60) Provisional application No. 61/641,782, filed on May 2, 2012.

(51) Int. Cl.
*B62B 7/06* (2006.01)
*B62B 7/08* (2006.01)

(52) U.S. Cl.
CPC . *B62B 7/06* (2013.01); *B62B 7/083* (2013.01); *B62B 7/068* (2013.01); *B62B 2205/20* (2013.01)
USPC ........................................................ 280/649

(58) Field of Classification Search
CPC .. B60N 2/2848; B62B 3/022; B62B 2205/06; B62B 2205/20; B62B 7/06; B62B 7/068; B62B 7/083
USPC ............ 280/640, 37, 38, 642, 647, 649, 650, 280/651, 657
See application file for complete search history.

(56) References Cited

U.S. PATENT DOCUMENTS

| | | | | |
|---|---|---|---|---|
| 1,081,221 A * | 12/1913 | Durkin | ........................ | 280/641 |
| 1,703,282 A * | 2/1929 | Skinner | ........................ | 108/118 |
| 2,616,719 A * | 11/1952 | Heideman | .................... | 280/648 |
| 4,192,541 A * | 3/1980 | Ferneau | .......................... | 296/20 |
| 4,714,224 A * | 12/1987 | Calmes | ......................... | 248/465 |
| 4,886,289 A | 12/1989 | Yee et al. | | |
| 5,499,831 A * | 3/1996 | Worth et al. | .................... | 280/30 |
| 5,794,951 A * | 8/1998 | Corley et al. | .................. | 280/30 |
| 6,099,022 A * | 8/2000 | Pring | ........................... | 280/648 |
| 6,152,340 A * | 11/2000 | Chen et al. | .................... | 224/409 |
| 6,155,592 A | 12/2000 | Hsia | | |
| 6,296,259 B1 * | 10/2001 | Anderson | ....................... | 280/30 |
| 6,302,412 B1 * | 10/2001 | Worth et al. | .................... | 280/30 |
| 6,398,233 B1 * | 6/2002 | Liang et al. | .................... | 280/30 |
| 6,409,205 B1 * | 6/2002 | Bapst et al. | .................. | 280/642 |

(Continued)

FOREIGN PATENT DOCUMENTS

| | | | | |
|---|---|---|---|---|
| DE | 4214537 A1 * | 11/1993 | ............... | B62B 7/06 |
| GB | 2438386 A | 11/2007 | | |

(Continued)

*Primary Examiner* — Hau Phan
*Assistant Examiner* — Jacob Meyer
(74) *Attorney, Agent, or Firm* — Gifford, Krass, Sprinkle, Anderson & Citkowski, P.C.; Douglas J. McEvoy

(57) ABSTRACT

A cart for use in supporting an infant carrier which includes an articulating frame having front and rear pairs of spaced apart and elongated members. Pairs of wheels are secured to lower ends of the elongated members. First and second latch sub-assemblies each include a pair of pivotally connected and conduit shaped bodies, these sliding over intermediate locations of the pairs of elongate members and such that the elongate members are permitted to pivot between expanded and collapsed positions. A perimeter defined frame is supported upon pivotally inter-connecting upper ends of the elongated members, the frame adapted to support the infant carrier thereupon during ambulatory traversing of the cart.

12 Claims, 7 Drawing Sheets

(56) References Cited

U.S. PATENT DOCUMENTS

| | | | |
|---|---|---|---|
| 6,446,990 B1 * | 9/2002 | Nania et al. | 280/47.371 |
| 6,626,452 B2 * | 9/2003 | Yang et al. | 280/643 |
| 6,679,506 B2 * | 1/2004 | Koppes et al. | 280/47.34 |
| 6,752,414 B1 * | 6/2004 | Waldron et al. | 280/649 |
| 7,017,924 B1 | 3/2006 | Lambert | |
| 7,055,847 B2 * | 6/2006 | Miller et al. | 280/638 |
| 7,128,325 B1 * | 10/2006 | Garston | 280/38 |
| 7,229,083 B2 | 6/2007 | Arai et al. | |
| 7,464,957 B2 * | 12/2008 | Worth et al. | 280/642 |
| 7,540,507 B1 * | 6/2009 | Kennedy | 280/30 |
| 7,624,954 B2 * | 12/2009 | Randle et al. | 248/129 |
| 7,757,999 B2 * | 7/2010 | Zhang | 248/166 |
| 7,997,590 B2 * | 8/2011 | Walters et al. | 280/35 |
| 8,172,256 B2 * | 5/2012 | Fine | 280/651 |
| 8,210,562 B2 * | 7/2012 | Ohnishi | 280/642 |
| 8,282,119 B1 | 10/2012 | Caksa | |
| 8,464,994 B2 * | 6/2013 | Chiu | 248/439 |
| 2004/0070179 A1 * | 4/2004 | Miller et al. | 280/651 |
| 2006/0131841 A1 | 6/2006 | Huang | |
| 2007/0257471 A1 | 11/2007 | Myers et al. | |
| 2008/0136233 A1 * | 6/2008 | Randle et al. | 297/250.1 |
| 2009/0134604 A1 * | 5/2009 | Ohnishi | 280/649 |
| 2012/0200052 A1 | 8/2012 | Shapiro | |

FOREIGN PATENT DOCUMENTS

| | | | |
|---|---|---|---|
| KR | 200461455 Y1 | 7/2012 | |
| WO | WO 9322178 A1 * | 11/1993 | B62B 7/10 |

* cited by examiner

CHILD CARRIER FOLDING CART

CROSS-REFERENCE TO RELATED APPLICATIONS

The present application claims the priority of U.S. Ser. No. 61/641,782 filed May 2, 2012, the contents of which are incorporated herein in its entirety.

FIELD OF THE INVENTION

The present invention relates generally to a collapsible and foldable cart or trolley, such as which can be converted from a wheeled and elevated/article supporting configuration to a flattened and easily stowable configuration. In particular, the present invention discloses a child carrier folding cart which provides ease of expansion or collapsing and which, in an expanded/use position, establishes a rectangular extending perimeter support defining an open interior and for seating or engaging either or both an underside or sides of a child carrier, such as an infant car seat. The folding cart is lightweight, amenable to one handed operation with the child carrier supported thereupon and easily collapsed or re-expanded through the use of a pair of hinge located latches with associated lever portions.

BACKGROUND OF THE INVENTION

The prior art is documented with examples of child stroller or like article support devices. A first example of this is depicted by the universal infant carrier transport device of Myers et al., US 2007/0257471. The carrier is a tri-wheel baby stroller and includes a horizontal platform and which is adapted to receive and support a bottom of the infant carrier.

Caska, U.S. Pat. No. 8,282,119, teaches a collapsible child stroller system with means for attaching an infant carrier at an upper location along with a second child at a lower position occupying a typical front facing seat. Yee et al., U.S. Pat. No. 4,886,289 teaches a foldable two seat face-to-face tandem baby carriage including a pair of wheeled front legs, a pair of wheeled rear legs, and two pairs of horizontal longitudinal bars extending between the legs.

Additional prior art references of note include each of the frame structure with detachable infant carrier of Huang, US 2006/0131841, the foldable supporting frame for a stroller of Hsia, U.S. Pat. No. 6,155,592 and the stroller upon which a basket can be mounted of Arai et al., U.S. Pat. No. 7,229,083.

SUMMARY OF THE INVENTION

The present invention discloses a foldable and portable cart for facilitating the attachment and support of any child carrier product not limited to an infant carrier or the like. The collapsible cart is designed to facilitate the attachment of the child/infant carrier, such as upon front and rear and/or opposite side interconnected portions of a rectangular and perimeter extending support upon which the conventional infant carrier or the like is clipped, attached or otherwise vertically supported in any fashion desired.

The cart includes an articulating frame having front and rear pairs of spaced apart and elongated members. Pairs of wheels are secured to lower ends of the elongated members. First and second latch sub-assemblies each include a pair of pivotally connected and conduit shaped bodies, these sliding over intermediate locations of the pairs of elongate members and such that the elongate members are permitted to pivot between expanded and collapsed positions. A perimeter defined frame is supported upon pivotally inter-connecting upper ends of the elongated members, the frame adapted to support the infant carrier thereupon during ambulatory traversing of the cart.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As previously described, the present invention discloses a foldable and portable cart for facilitating the attachment and support of any child carrier product not limited to an infant carrier or the like. The product is designed to facilitate the attachment of the child/infant carrier, such as upon front and rear and/or opposite side interconnected portions of a rectangular and perimeter extending support upon which the conventional infant carrier or the like is clipped, attached or otherwise vertically supported.

As will be described in further detail with reference to FIGS. 1-12, the child carrier folding cart establishes three locking positions, including a full height position (FIGS. 1-6), a half-height and intermediate adjusted position (facilitated by unlocking of lever portion as in FIG. 7), and a folded flat position (FIGS. 8-11). Without limitation, and according to one variant, a pair of front mounted wheels associated with the frame are swivelable, with a corresponding pair of rear wheels being stationary. Additional features associated with the product include its light weight (in one variant being constructed of hollow tubular members and weighing approximately two pounds) and ease of collapsing and re-expansion, such as through the simultaneous manipulation of the spring loaded lever portions in the manner illustrated and described below.

Figure 1:
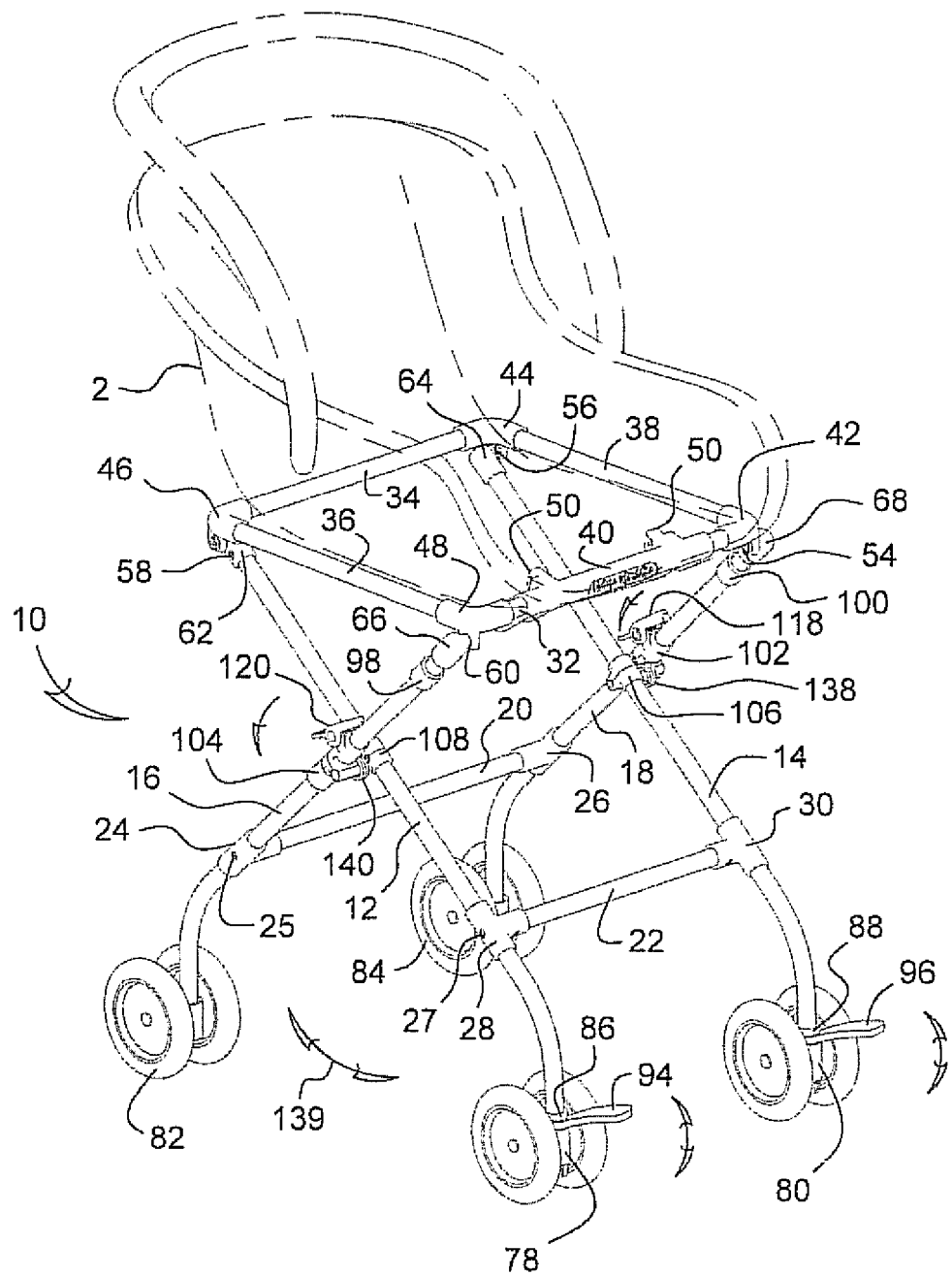
FIG. 1 is an environmental perspective of the child carrier folding cart according to one non-limiting variant of the present invention.
Figure 2:
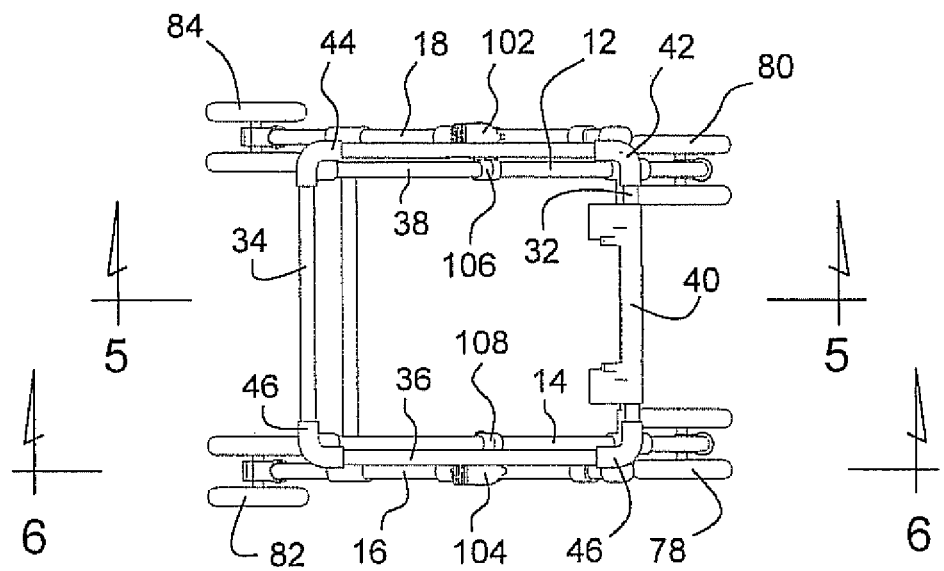
FIG. 2 is a top view of the child carrier folding cart.
Figure 3:
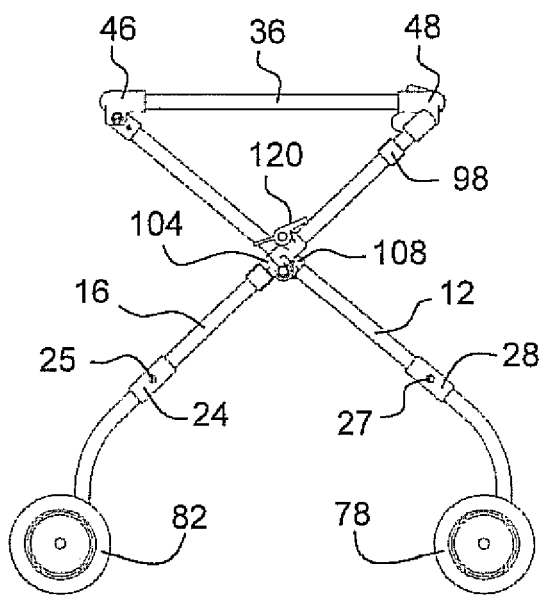
FIG. 3 is a side view of the cart in a full height expanded position.
Figure 4:
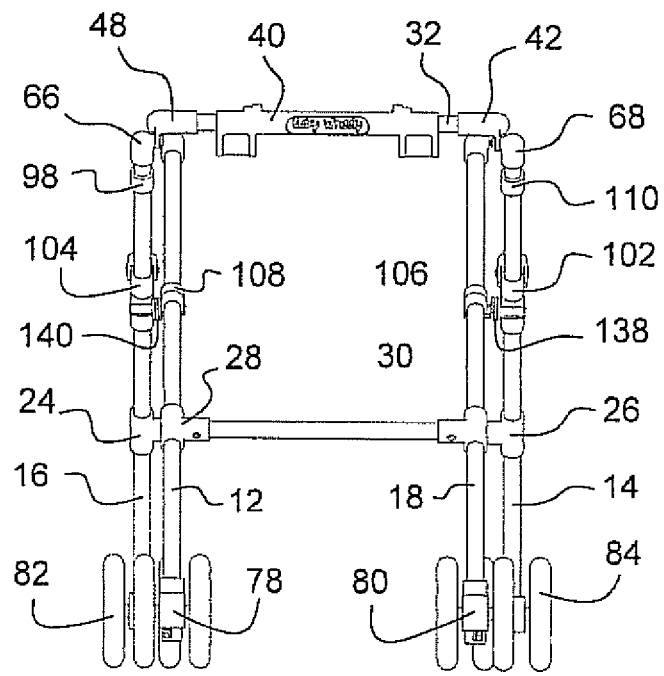
FIG. 4 is a front view of the cart in FIG. 3.
Figure 5:
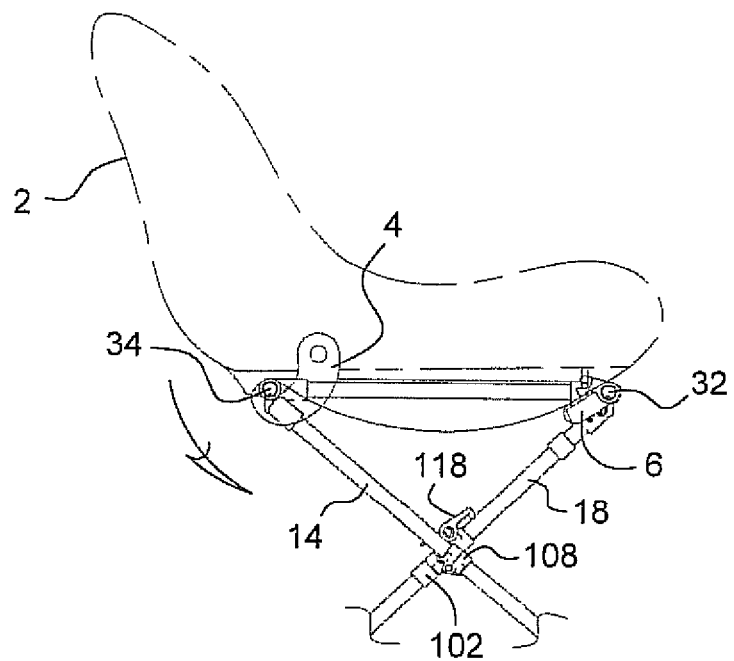
FIG. 5 is cross sectional view taken along line 5-5 of FIG. 2 and illustrating a selected side of the linkage associated with the folding cart with a child carrier depicted in phantom and latched to the cart.
Figure 12:
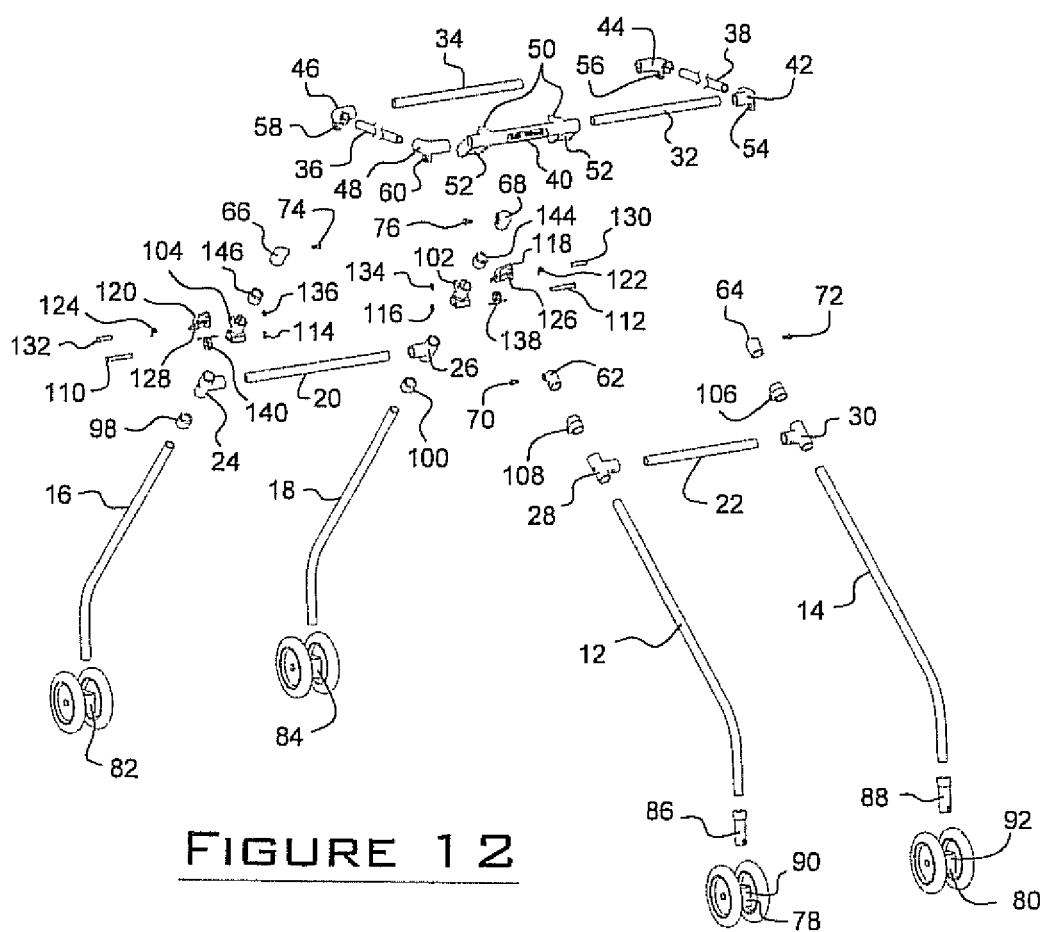
FIG. 12 is an exploded view of the child carrier folding cart.

The above said, and with reference to the exploded view of FIG. 12 in combination with the various perspective, plan and cutaway views of FIGS. 1-11, a child carrier folding cart (see as generally shown at 10) in FIG. 1, is provided for supporting a conventional child or infant carrier as depicted in phantom at 2 in each of FIGS. 1 and 5. As previously explained, the infant carrier 2 can be supported in any of a number of fashions upon the perimeter defined opening associated with the collapsible and ambulatory cart, with one non-limiting example depicting a pivoting underside latch, see at 4 in FIG. 5, associated with a side edge of the carrier 2 and which can be pivoted, snapped or otherwise engaged to a selected perimeter defining support member.

Referring again to FIG. 12, the cart 10 includes a frame constructed of pairs of front 12 & 14 and rear 16 & 18 elongated portions with arcuate or bent lower portions. The pairs of elongated portions 12 & 14 and 16 & 18 are structurally supported by like constructed and linear cross members 20 and 22 which, as best shown in FIG. 12, are mounted via front and rear pairs 24/26 and 28/30 of "T" connectors and such that the cross members 20 and 22 are positioned at linear locations along the pairs of elongate members as best depicted in FIG. 1 (further noting that the "T" connectors receive fasteners as depicted at 25 and 27 for selected "T" connectors 24 and 28 in FIG. 1 for affixing at the desired locations along the front and rear pairs of the elongated members).

An additional plurality of upper interconnecting and open rectangular perimeter defining members are further depicted by front 32, rear 34, first (reduced length in FIG. 12) side 36 and second (also reduced length in FIG. 12) side 38. A cover sleeve 40 (such as bearing a branding indicia) is provided and through which can be coaxially inserted the front member 32. A plurality of elbow interconnecting portions 42, 44, 46 and 48 are provided and interconnect the members 32-38 to establish the generally rectangular shaped and perimeter defining support also shown in FIG. 1.

Without limitation, each of the elongated tubular members and elbow or T shaped interconnecting members previously identified can be constructed of any of a lightweight aluminum or rigid plastic material, such as in order to establish both a necessary strength and durability while achieving a desired minimal weight (in one application as little as 2 lbs) for providing ease of manipulation by the user. The cover sleeve 40 can also include angularly offset pairs 50 and 52 of clip locations for a number of purposes, not limited to facilitating engagement of the child carrier 2 in the manner shown in FIG. 1.

Each of the upper perimeter defining elbow portions 42, 44, 46 and 48 further exhibit a lower projecting portion 54, 56, 58 and 60, respectively, and through which is configured a pivotal mounting aperture. Pivotally interconnecting end caps 62/64 and 66/68 are provided for the front and rear pairs of tubular members 12/14 and 16/18 and which are configured to mount over the upper ends of the tubular members (see again FIG. 1) and to be pivotally mounted to the underside projections 54-60 of the elbow portions 42-48 via mounting pins 70, 72, 74 and 76 (again FIG. 12).

FIG. 12 again best depicts pairs of front 78 & 80 and rear 82 & 84 wheels. As previously described, the front wheels can be swivelable, as evidenced by intermediate collars 86 and 88 which affix to bottom ends of the front pair 12 and 14 of elongate members and winch in turn seat within collar receiving cavities 90 and 92 defined in the connecting structure of the wheels 78 and 80. As further depicted in FIG. 1, pivotal locking levers 94 and 96 can be provided and which include any desired cam or engaging profile for preventing traversing of the cart. Other features include collars 98 and 100 (FIG. 12) seating over the rear elongated members 16/18 and underneath the "T" connectors 24/26.

As best shown in the cutaway illustrations of FIGS. 6-7, again in combination with the assembled view of FIG. 1 and the exploded view of FIG. 12, a pair of side latch sub-assemblies are depicted which pivotally interconnect side overlapping pairs 12/16 and 14/18 of the elongated members as shown. As will be described, the latch assemblies are constructed such that they facilitate combined inter-pivoting and linear sliding displacement along the exterior surfaces of the elongated members between the fully expanded position of FIG. 1 and the fully collapsed position of FIG. 8.

Figure 6:
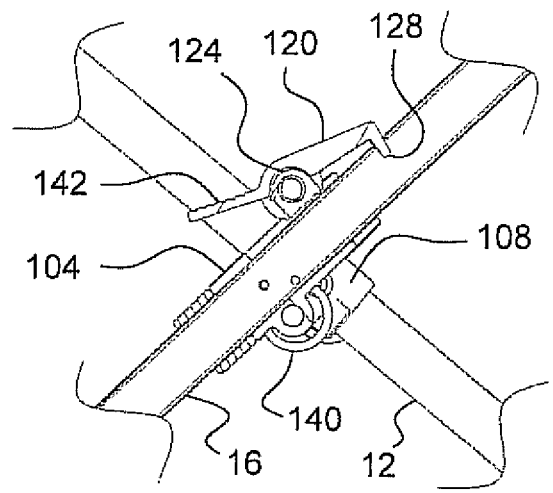
FIG. 6 is a further cross sectional cutaway taken along line 6-6 of FIG. 2 of a selected combination sliding and pivoting linkage associated with the folding cart and with the lock lever portion in a locked position.
Figure 7:
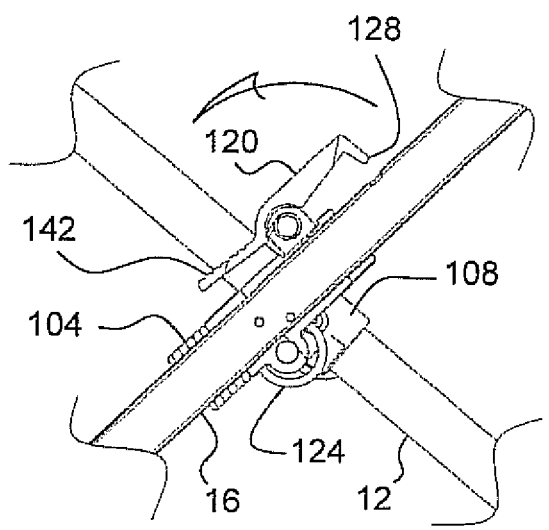
FIG. 7 is a succeeding cross sectional cutaway similar to FIG. 6 and depicting the lock lever portion in a rotated and un-locking position to permit collapsing of the cart.
Figure 8:
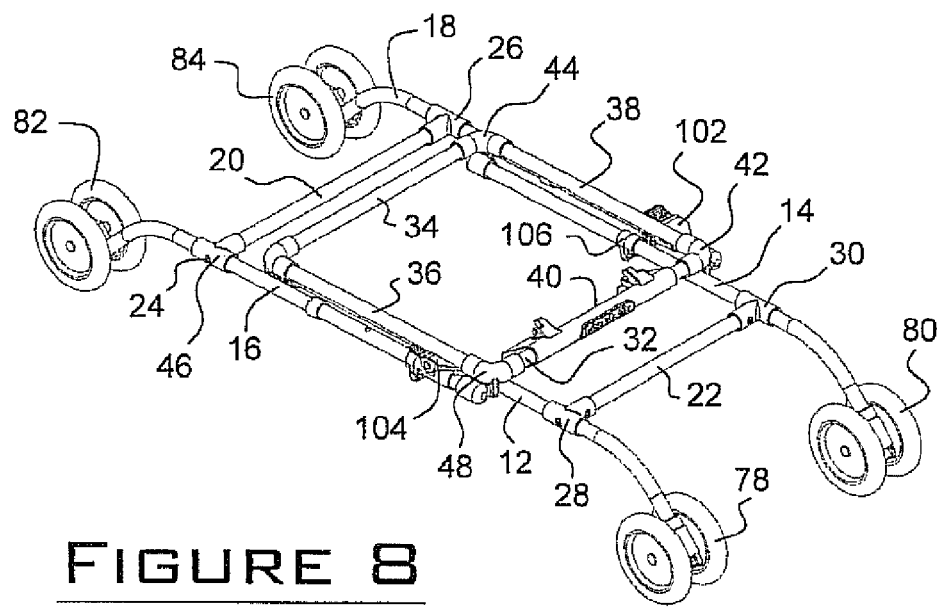
FIG. 8 is a perspective view of the cart in a fold-flat configuration.
Figure 9:
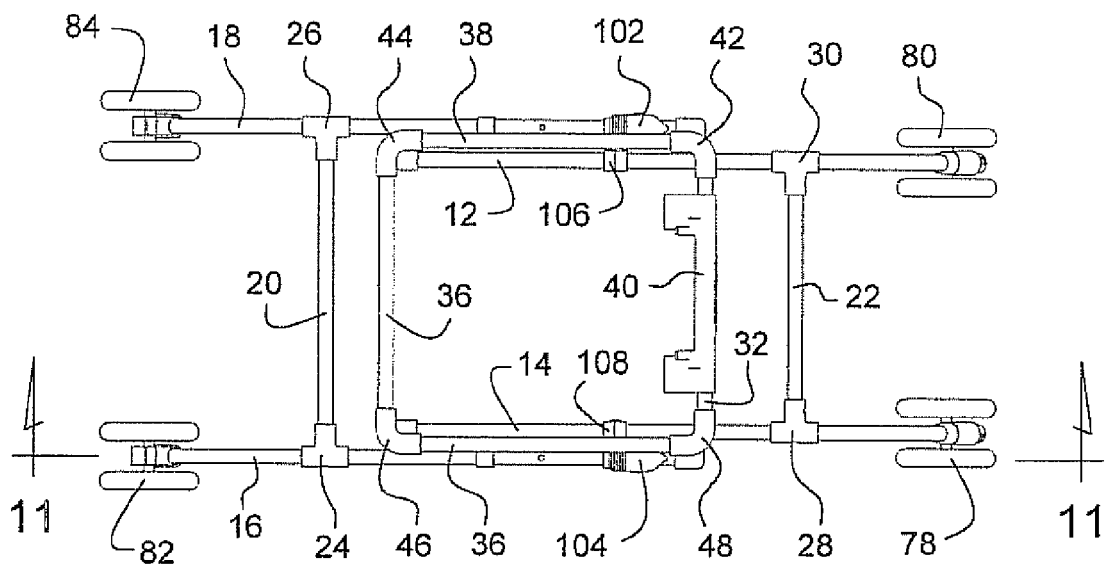
FIG. 9 is a top view of the fold flat cart in FIG. 8.
Figure 10:
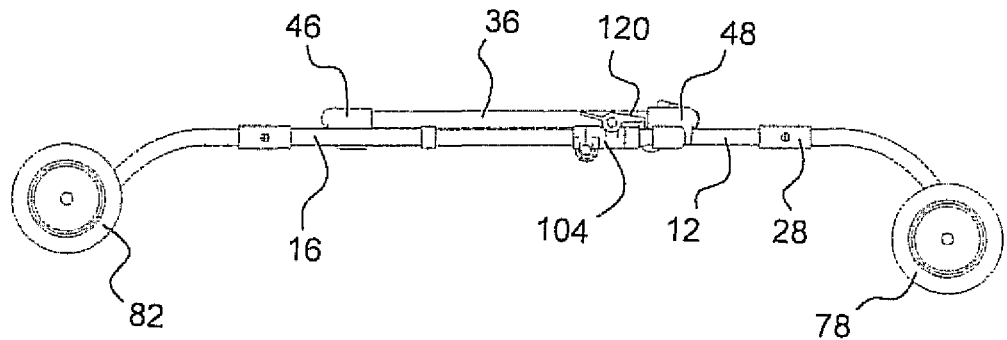
FIG. 10 is a side view of the fold flat cart of FIGS. 8-9.
Figure 11:
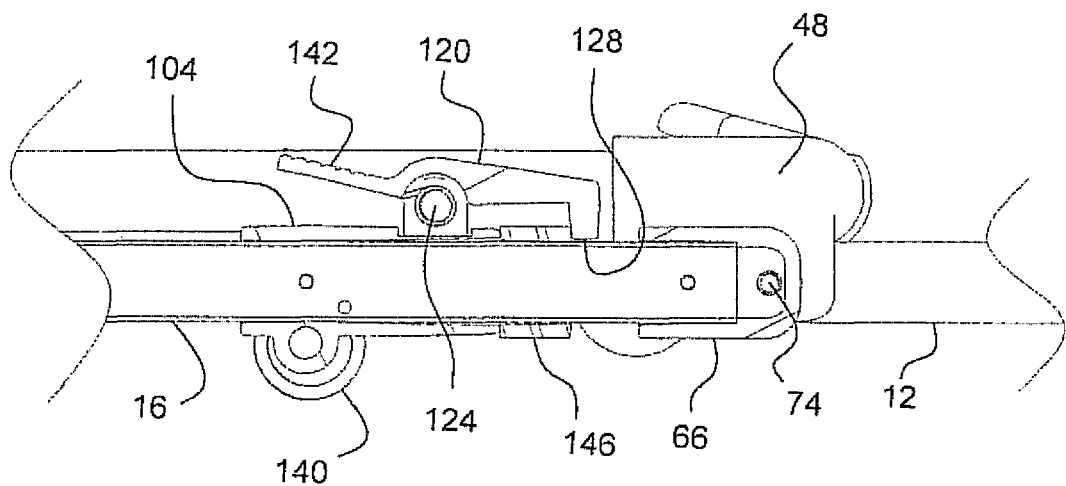
FIG. 11 is a cross sectional cutaway taken along line 11-11 of FIG. 9 and depicting sliding/pivoting linkage and associated lock lever portion locked in the folded flat position.

Each combination pivoting and sliding latch assembly includes a main conduit body, at 102 and 104, which is dimensioned to slide over associated elongate members 16 and 18. Particular reference is made to selected conduit body 104 in FIG. 6 shown in cutaway in slidably supported fashion over associated elongate tubular member 16. A second pair of smaller conduits 106 and 108 are likewise slidably supported over the other inter-engaging elongated members 12 and 14 and to be pivotally interconnected with the main conduit bodies 102/104 as best depicted in FIG. 6 by secondary body 108 pivotally hinged to main body 104.

Fasteners are indicated at 110 and 112 with end nuts 114 and 116 in FIG. 12 and in order to pivotally inter-assemble the conduit (or elongated member) receiving bodies 102/106 and 104/108 (again FIGS. 6-7) in the manner shown. A lever portion 118 and 120 is depicted for each latch subassembly and which is mounted, via coil springs 122 and 124, to an upper projecting and supporting location of each of the main conduit bodies 102 and 104, this in order that a spring loaded tip 126 and 128 of each lever portion is biased in a direction that will cause it to seat within an aligning aperture location (see again in FIGS. 6 and 7) defined in each of the elongated members 16 and 18.

Pin fasteners 130/132 and corresponding nuts 134/136 mount the lever portions 118 and 120 in the manner shown. Additional coil springs 138 and 140 are depicted which bias between the inter-pivotal conduit bodies 104/108 and 102/106 and so that the pivotal frame is influenced in an expanding direction as evidenced by arrow 139 in FIG. 1.

In this fashion, and upon the lever portions 118 and 120 being simultaneously rotated out of engagement with the associated elongate members configured in the collapsed position of FIGS. 8-11, the biasing (assist) aspects of the springs 138 and 140 influence the pivotal/sliding latch assemblies to re-expand to the original position of FIG. 1. This can be further assisted by the user holding the collapsed cart in an elevated position and, upon simultaneously rotating the lever portions 118 and 120 (such as via reverse extending gripping tabs as best depicted at 142 in FIG. 6 for selected lever 120) against the biasing/engaging force of the secondary springs 122 and 124, causing the main springs 138 and 140 to exert the pivoting/expanding force to quickly expand and elevate the perimeter defined support surface to the position of FIG. 1. FIG. 12 also depicts addition collar supports 144 and 146 for supporting the upper ends of the main conduit bodies 102/104 of the inter-pivoting latch assemblies.

Having described my invention, other and additional preferred embodiments will become apparent to those skilled in the art to which it pertains, and without deviating from the scope of the appended claims. In particular, the cart design as previously explained can also include any number of intermediate adjustment locations, these corresponding to additional and aligning apertures defined at selected linearly spaced locations along parallel extending and spaced apart elongated members 16 and 18, this in order to achieve any desired height configuration established by the latch assemblies (and again which results from simultaneous disengagement of the lever portions 118 and 120 such that their projecting tips 126 and 128 can unseat from any first selected pair of apertures in the members 16/18 and subsequently re-seat in a further linearly spaced pair of apertures.

It is also envisioned that the clip engagement construction depicted in FIG. 5 for latching the underside of the child carrier 2 to any one or more of the perimeter establishing members 32, 34, 36 and 38 can further include any variation of structure, such as not limited to an additional forward latching portion 6 which corresponds to the rear latch 4 previously described and in order to engage the front 32 and rear 34 perimeter defining supports. In a simplest variant, this can also include simply supporting the underside of the child carrier 2 by either friction or gravity upon or within the perimeter defined support.

I claim:

1. A cart for use in supporting an infant carrier, comprising:
    an articulating frame including front and rear pairs of spaced apart and elongated members;
    pairs of wheels secured to lower ends of said elongated members;
    first and second latch sub-assemblies including pairs of pivotally connected and conduit shaped bodies sliding over intermediate locations of said pairs of elongated members such that said members are permitted to pivot between expanded and collapsed positions;
    a perimeter defined frame supported upon pivotally interconnecting upper ends of said elongated members, said perimeter defined frame including a plurality of front, rear, first side and second side extending members;
    a plurality of elbow portions interconnecting said front, rear and side extending members; and
    a cover sleeve being slidably supported over said front member, said cover sleeve further including angularly offset pairs of clip locations facilitating engagement of the child carrier, said frame adapted to support the infant carrier thereupon during ambulatory traversing of said cart.

2. The cart as described in claim 1, further comprising said pairs of elongated members being structurally supported by like constructed and linear cross members, via front and rear pairs of "T" connectors.

3. The cart as described in claim 1, said upper perimeter defining elbow portions each further comprising a lower projecting portion through which is configured a pivotal mounting aperture, pivotally interconnecting end caps being provided for each of front and rear pairs of elongated members and which are configured to mount over said upper ends of said elongated members and to be pivotally mounted to underside projections associated with said elbow portions via mounting pins.

4. The cart as described in claim 1, further comprising a front pair of said wheels being swivelable, a rear pair of said wheels being stationary.

5. The cart as described in claim 4, further comprising intermediate collars affixing to bottom ends of said front pair of elongate members and which in turn seat within collar receiving cavities defined in associated connecting structure of said front wheels.

6. The cart as described in claim 5, further comprising locking levers provided for said swivelable wheels and which include any desired cam or engaging profile for preventing traversing of the cart.

7. The cart as described in claim 1, said latch sub-assemblies further comprising fasteners and engaging end nuts for pivotally inter-assembling said pairs of conduit shaped bodies.

8. The cart as described in claim 7, said latch sub-assemblies each further comprising a lever portion mounted, via a coil spring, to an upper projecting and supporting location of a main conduit shaped body, a spring loaded tip of each lever portion being biased in a direction causing it to seat within an aligning aperture location defined in said elongated member over which said main conduit body is slidably supported.

9. The cart as described in claim 8, further comprising pin fasteners and corresponding nuts mounting said lever portions to said main conduit shaped bodies, additional coil springs biasing between said inter-pivotal supported conduit bodies so that said articulating frame is influenced in an expanding direction.

10. The cart as described in claim 1, said frame being constructed of any of a lightweight aluminum or plastic material.

11. A cart for use in supporting an infant carrier, comprising:
    an articulating frame including front and rear pairs of spaced apart and elongated members;
    pairs of wheels secured to lower ends of said elongated members, a front pair of said wheels being swivelable, a rear pair of said wheels being stationary, intermediate collars affixing to bottom ends of said front pair of elongated members and which in turn seat within collar receiving cavities defined in associated connecting structure of said front wheels;
    first and second latch sub-assemblies including pairs of pivotally connected and conduit shaped bodies sliding over intermediate locations of said pairs of elongated members such that said elongated members are permitted to pivot between expanded and collapsed positions; and
    a perimeter defined frame supported upon pivotally interconnecting upper ends of said elongated members, said frame adapted to support the infant carrier thereupon during ambulatory traversing of said cart.

12. A cart for use in supporting an infant carrier, comprising:
    an articulating frame including front and rear pairs of spaced apart and elongated members;
    pairs of wheels secured to lower ends of said elongated members;
    first and second latch sub-assemblies including pairs of pivotally connected and conduit shaped bodies sliding over intermediate locations of said pairs of elongated members such that said elongated members are permitted to pivot between expanded and collapsed positions;
    said latch sub-assemblies further including fasteners and engaging end nuts for pivotally inter-assembling said pairs of conduit shaped bodies,
    said latch sub-assemblies each further including a lever portion mounted, via a coil spring, to an upper projecting and supporting location of a main conduit shaped body, a spring loaded tip of each lever portion being biased in a direction causing it to seat within an aligning aperture location defined in said elongated member over which said main conduit body is slidably supported;
    pin fasteners and corresponding nuts mounting said lever portions to said main conduit shaped bodies, additional coil springs biasing between said inter-pivotal supported conduit bodies so that said articulating frame is influenced in an expanding direction; and a perimeter defined frame supported upon pivotally interconnecting upper ends of said elongated members, said frame adapted to support the infant carrier thereupon during ambulatory traversing of said cart.

\* \* \* \* \*